United States Patent
Lewis-Gray

(10) Patent No.: US 11,944,985 B2
(45) Date of Patent: Apr. 2, 2024

(54) BOWL FOR A BATCH CENTRIFUGAL CONCENTRATOR

(71) Applicant: Gekko Systems Pty Ltd., Ballarat (AU)

(72) Inventor: Alexander Hamilton Lewis-Gray, Ballarat (AU)

(73) Assignee: GEKKO SYSTEMS PTY LTD., Ballarat (AU)

( * ) Notice: Subject to any disclaimer, the term of this patent is extended or adjusted under 35 U.S.C. 154(b) by 890 days.

(21) Appl. No.: 16/964,986

(22) PCT Filed: Jan. 25, 2019

(86) PCT No.: PCT/AU2019/000010
§ 371 (c)(1),
(2) Date: Jul. 26, 2020

(87) PCT Pub. No.: WO2019/144179
PCT Pub. Date: Aug. 1, 2019

(65) Prior Publication Data
US 2021/0046488 A1    Feb. 18, 2021

(30) Foreign Application Priority Data
Jan. 25, 2018  (AU) ................. 2018900238

(51) Int. Cl.
*B04B 1/14* (2006.01)
*B04B 7/12* (2006.01)

(52) U.S. Cl.
CPC . *B04B 1/14* (2013.01); *B04B 7/12* (2013.01)

(58) Field of Classification Search
CPC .... B04B 1/14; B04B 7/12; B04B 1/00; B04B 7/08; B04B 15/12; B04B 1/08; B04B 7/14; B04B 15/06; Y02P 10/20
See application file for complete search history.

(56) References Cited

U.S. PATENT DOCUMENTS

| 3,012,710 | A | 10/1958 | Steinacker |
| 2006/0135338 | A1 | 6/2006 | Zonneveld |
| 2011/0315621 | A1* | 12/2011 | Heley ............. B04B 7/16 210/232 |

FOREIGN PATENT DOCUMENTS

CA    2443239 A1 * 12/2003 ............... B03B 5/32

OTHER PUBLICATIONS

International Search Report issued in corresponding International Patent Application No. PCT/AU2019/000010 dated Apr. 10, 2019, consisting of 5 pp.

* cited by examiner

*Primary Examiner* — Walter D. Griffin
*Assistant Examiner* — Shuyi S. Liu
(74) *Attorney, Agent, or Firm* — Volpe Koenig

(57) ABSTRACT

The present invention is a segmented bowl for a batch centrifugal concentrator constructed from a plurality of segments that are each placed adjacently to one another, so that each segment is in intimate contact with its neighbouring segments, so that when a sufficient number of segments are put into place, they form the bowl of the batch centrifugal concentrator.

20 Claims, 5 Drawing Sheets

BOWL FOR A BATCH CENTRIFUGAL CONCENTRATOR

FIELD OF THE INVENTION

This invention relates to Batch Centrifugal Concentrators, and in particular it relates to the bowl component used therein.

BACKGROUND OF THE INVENTION

Batch Centrifugal Concentrators (BCC) are a class of major equipment used mainly in minerals processing operations. They are often used in remote locations. Due to the nature of their operation, they are continuously subjected to large impact loads and abrasive slurry flows. The major component of any BCC is the bowl. The inner sidewall of the bowl is subjected to a very mechanically hostile environment during its operation, and therefore the bowl needs to be robust and durable so that the BCC has a satisfactory operational life between maintenance and refurbishment operations where the equipment is required to be taken out of service. This typically has a significant impact on mine site operational efficiency and profitability. Typically, BCCs are large bulky apparatus, with a correspondingly large unitary bowl. Typically the bowl cannot simply be refurbished, and often it needs to be replaced. This poses a significant problem associated with the logistics of getting the components of the BCC from the manufacturer over to the remote site where the apparatus is required to operate. In large BCCs, the bowls can be difficult and expensive to transport to the site.

At the site, BCCs need to be taken out of service from time to time, to undergo routine maintenance and refurbishment operations. Due to the bulk and the weight of critical components, particularly the bowl, specialised lifting equipment is often necessary to manipulate the various components. On remote sites, this poses additional problems and costs associated with getting the heavy lifting equipment to the site when required. In many cases, sites operate multiple BCCs so that the capacity of the BCC operation is adequate to satisfy the production at the site. Also, multiple BCCs ensure that production can continue if there is an unscheduled maintenance event of any one BCC. However, having multiple BCCs means that the heavy lifting maintenance equipment needs to be relocatable at the site, so that each BCC can be operated upon when required.

Further to these problems, BCCs operate by creating zones upon the inner sidewall of the bowl that act as localised fluidized bed regions. They do this by injecting a fluid through a plurality of outflow ports strategically located around the periphery of the inner wall of the bowl that are adapted to inject fluid into the bowl. One major problem associated with this is that at least some of the outflow ports often become clogged with debris, as solids from the slurry being operated upon by the BCC are forced out of the slurry and become lodged in some, or all, of the inflow ports, thereby significantly degrading the fluidised bed effect and degrading the performance of the BCC.

It is therefore a goal of the present invention, to produce a BCC with a bowl that ameliorates at least some of the aforementioned problems.

DISCLOSURE OF THE INVENTION

Accordingly, the present invention is a segmented bowl for a batch centrifugal concentrator constructed from a plurality of segments that are each placed adjacently to one another, so that each segment is in intimate contact with its neighbouring segments, so that when a sufficient number of segments are put into place, they form the bowl of the batch centrifugal concentrator.

Preferably, the segments are arcuate in shape, and when put in place, they combine to form a bowl shape with a circular profile and a suitably sloping interior sidewall. This wall will consist of an interior sidewall profile that is adapted to optimally concentrate precious components from a slurry operated upon by the batch centrifugal concentrator.

Optionally, there are a plurality of different shapes of segments, and each different shape of segment is capable of being laid adjacent to each other, and in intimate contact with its neighbouring segments, to form one discrete layer within the formation of the bowl.

Preferably, each discrete layer of segments is in intimate contact with any adjacent layer of segments so that the bowl can be constructed by placing the segments into a plurality of discrete layers.

The segments remain in place and in intimate contact with adjacent segments even when the bowl in the batch centrifugal concentrator is rotated at operational speed.

Optionally, at least some of the individual segments are constructed out of at least two parts.

Preferably, the first part is a rearward part, nearest to the exterior of the bowl and the second part is a forward part, nearest to the interior of the bowl.

Preferably, the rearward part is adapted to permit fastening means to attach to and retain the forward part.

Preferably, the segment is adapted to enable the second part to be detached from the first part and replaced by a new second part if the original second part has become damaged or has otherwise reached the end of its useful life. It also allows for cleaning of the outflow holes and water channels inside of the segment.

Optionally, at least the second part is adapted to be 3D printed so that replacement second parts may be printed when required.

Preferably, at least some of the segments are hollow and include a fluid flow path that allows a suitable fluid, such as water, to flow into the segment via at least one inflow conduit, and at least partially flow out of the segment via at least one outflow port, into the interior of the bowl, even while the bowl is rotating at operational speed.

Preferably, the outflow of fluid into the interior of the bowl creates a fluidised bed effect in the vicinity of the outflow port on the interior sidewall of the bowl.

Optionally, each segment is capable of being fitted with an insert that overlays at least one outflow port and is adapted to still permit the outflow of the suitable fluid, while mitigating the likelihood of the ingress of any solid material into the outflow port, thereby reducing the chance of the outflow port from becoming clogged.

Preferably, the insert is hinged either at its top or bottom edge and is capable of swinging away from the outflow port, under the influence on the flow of fluid through the outflow port, and when the flow is suspended, the centrifugal forces associated with the rotating bowl cause the insert to swing back to its position overlaying the outflow port, thereby enabling the insert to act as a barrier, thereby preventing material from clogging the at least one outflow port.

In another preferred embodiment, the insert is manufactured from a suitably resilient and robust material.

Preferably, any suitable resilient material may be used, however the preferred material is rubber.

Preferably, the insert includes a flap portion and a bulbous portion.

Preferably, at least some of the segments that are hollow, includes retaining means that are adapted to retain the bulbous portion of the insert.

Preferably, the retaining means are adapted to enable an insert to be replaced when required.

Preferably, at least some of the segments include additional retaining means that are adapted to retain at least one cover.

Preferably, each cover is manufactured from a suitable hard-wearing material, and when attached to it associated segment via the additional retaining means, it presents a comparatively harder wearing surface to a region of the segment that is subjected to high wear during the normal operation of the batch centrifugal concentrator.

Preferably, the bowl is adapted to be transported to a site in a totally or partially disassembled condition, and then assembled at the site.

Optionally, each segment, or at least the forward portion of the segment, is capable of being manufactured on site using a suitable 3D printer.

DESCRIPTION OF THE PREFERRED EMBODIMENTS

Figure 1:
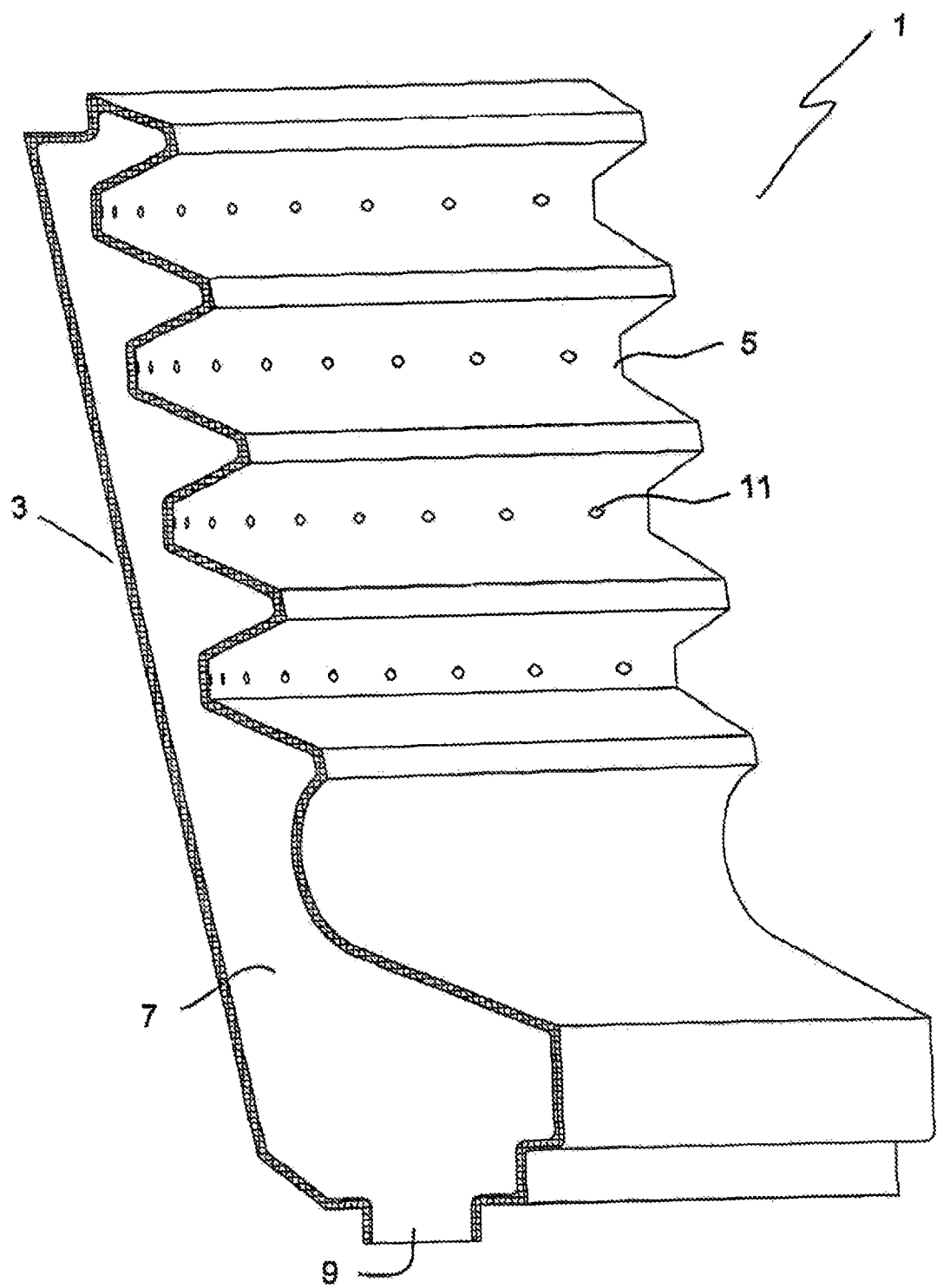
FIG. 1 is an isometric view with a cut away portion of one preferred embodiment of the present invention.

Turning firstly to FIG. 1, we are shown one form of the present invention where a preferred embodiment of the segment 1 is shown. The segment 1 has an outer sidewall portion 3 and an inner sidewall portion 5. In one preferred embodiment, the segment 1 is a unitary design, which could be manufactured in a single piece. In another preferred embodiment, the segment 1 is constructed from a plurality of sub-parts. Optionally the segment is capable of being produced by 3D printing. Preferably, the segment 1 is at least partially hollow, and includes a cavity 7. The cavity 7 has an inlet conduit 9, and a plurality of comparatively small outflow ports 11. Each segment 1 has an arcuate shape so that when a plurality of segments 1 are placed adjacent to one another in intimate contact, they combine to form a bowl with a circular profile, and a sloping inner sidewall 5. The bowl is capable of being spun at sufficiently high speed to induce a centripetal force on any material fed into the rotating bowl, while retaining the bowl's integrity. The outflow of a suitable fluid, typically water, through the plurality of outflow ports 11 creates zones within the inner sidewall 5 of the bowl that act as a fluidised bed.

Figure 2:
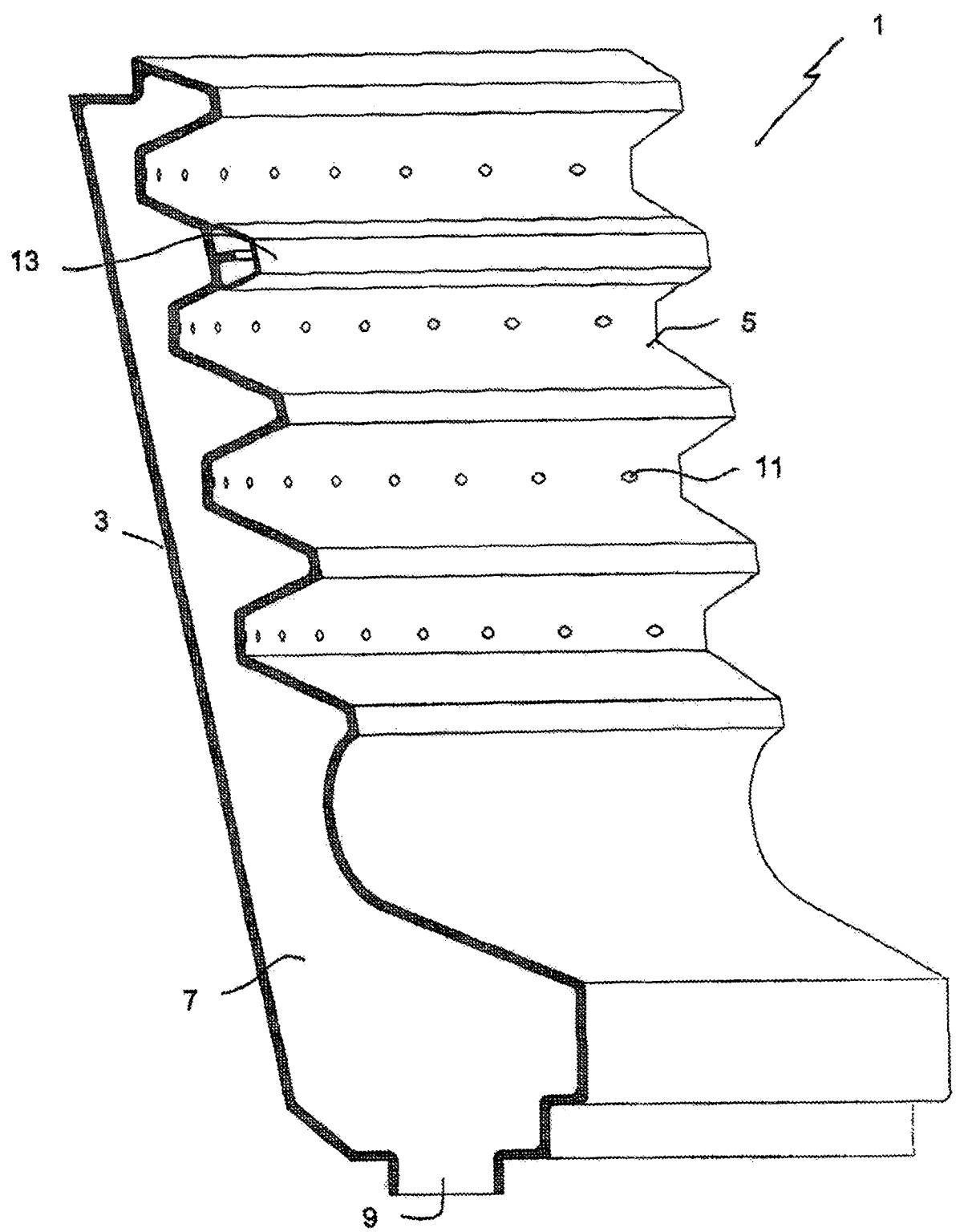
FIG. 2 is an isometric view of an alternative preferred embodiment of the present invention.

Turning to FIG. 2, we are shown an alternative preferred embodiment of the present invention. In this embodiment, the segment 1 includes an additional insert 13 that is removably insertable into the inner sidewall 5 of the segment 1. The additional insert 13 is manufactured from a suitable hard-wearing material, such as a metal, polyurethane or ceramic, and the additional insert thereby provides enhanced wear resistance in regions of the segment that are subjected to high wear. In another embodiment, this enhanced wear resistance material may be incorporated into the segment as part of the manufacturing process, for example, in the form of a liquid or paste that cures to form an integrated part of the bowl segment. This insert may either be exposed at the surface or buried below a surface layer of the bowl segment such that it becomes exposed as a result of operational wear. The interface between the high wear resistance material and the main body of the bowl segment can be keyed such that the hard-wearing material will not fall out of the segment during operation.

Figure 3:
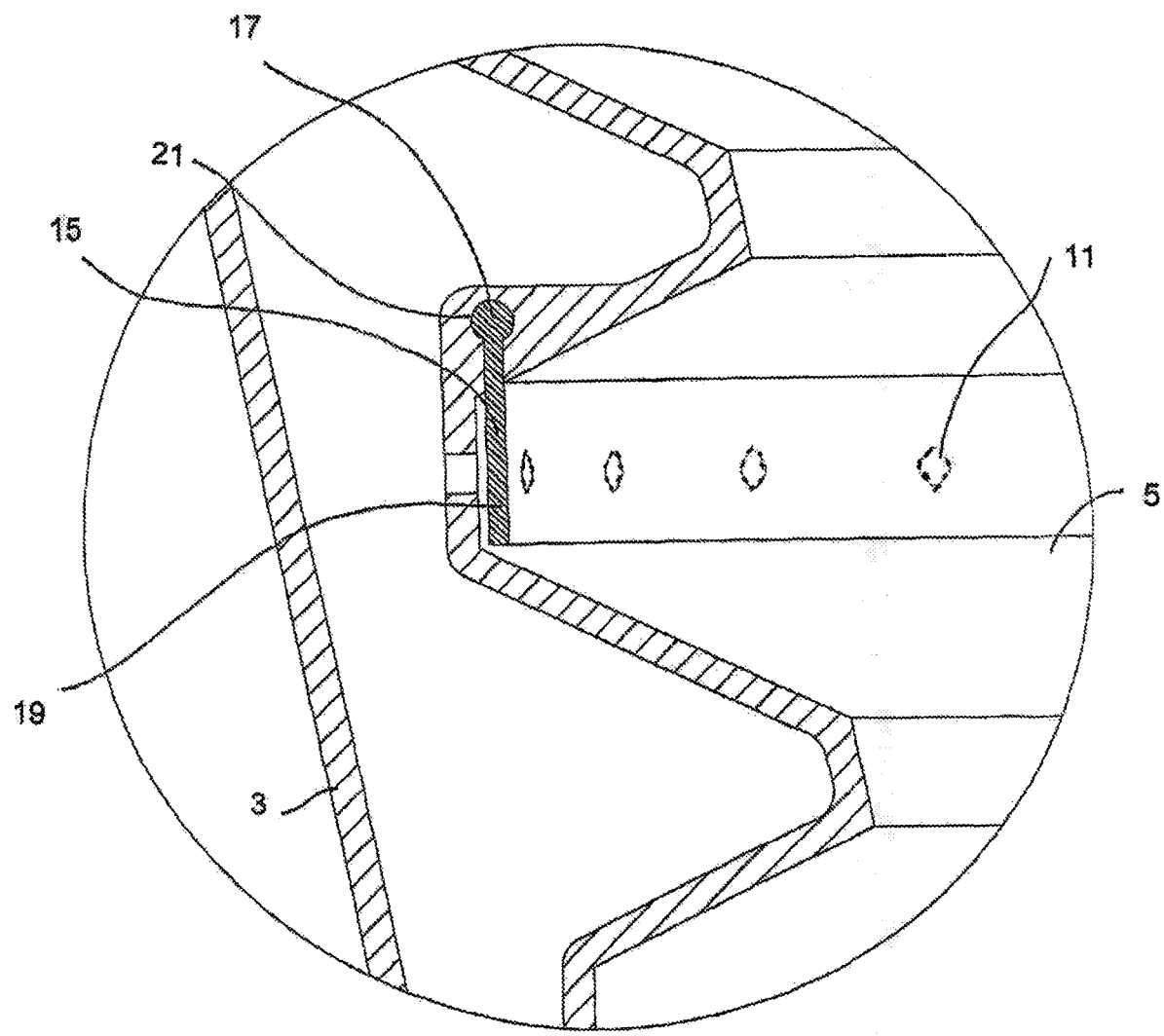
FIG. 3 is a close-up view of one preferred form of the insert in-situ within the segment.

Turning to FIG. 3, we are shown a preferred embodiment that includes a resilient insert 15. The insert includes a bulbous portion 17 and a flap portion 19. The bulbous portion 17 is capable of being removably inserted into retaining means 21 that are formed in the segment 1. At rest, or when the outflow of liquid is not flowing out of the outflow ports 11, the flap portion 19 overlays the outflow ports 11. The flap portion 19 mitigates the likelihood that solid material will become lodged in some, or all the outflow ports 11, causing them to become clogged. When the flow of liquid is present, the force of the flow forces the flap to move out of its overlaying position and allow the flow of fluid to proceed. In this embodiment, a resilient material is used, that is capable of yielding and resiliently deforming when in use, however it should be noted that other forms of insert are within the scope of the present invention, including a stiff form of insert that is hinged, preferably at the top, and is capable of swinging away from the outflow port under the influence of the outflow of fluid from the outflow ports 11.

Figure 4:
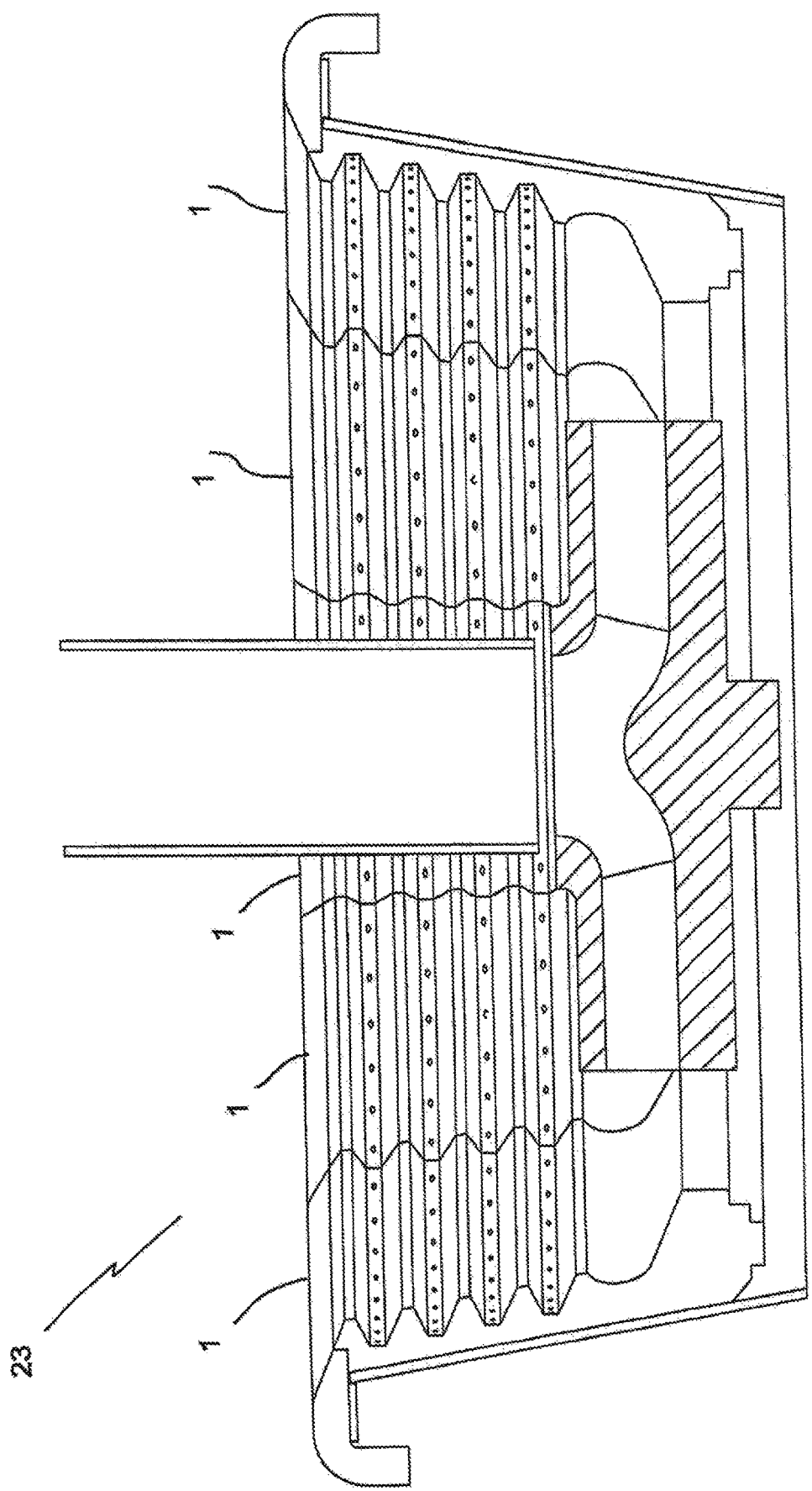
FIG. 4 is a cut-away side view showing the constructed bowl made up from a plurality of adjacent segments.

In FIG. 4, we are shown a sectional side view of a bowl 23 that has been constructed from a plurality of segments 1. In this preferred embodiment, a single segment extends from the bottom to the top of the bowl 23. In another preferred embodiment, there is a plurality of segment shapes that are adapted to form discrete layers of segments that are then placed one on top of the other, in intimate contact, to form the bowl.

Figure 5:
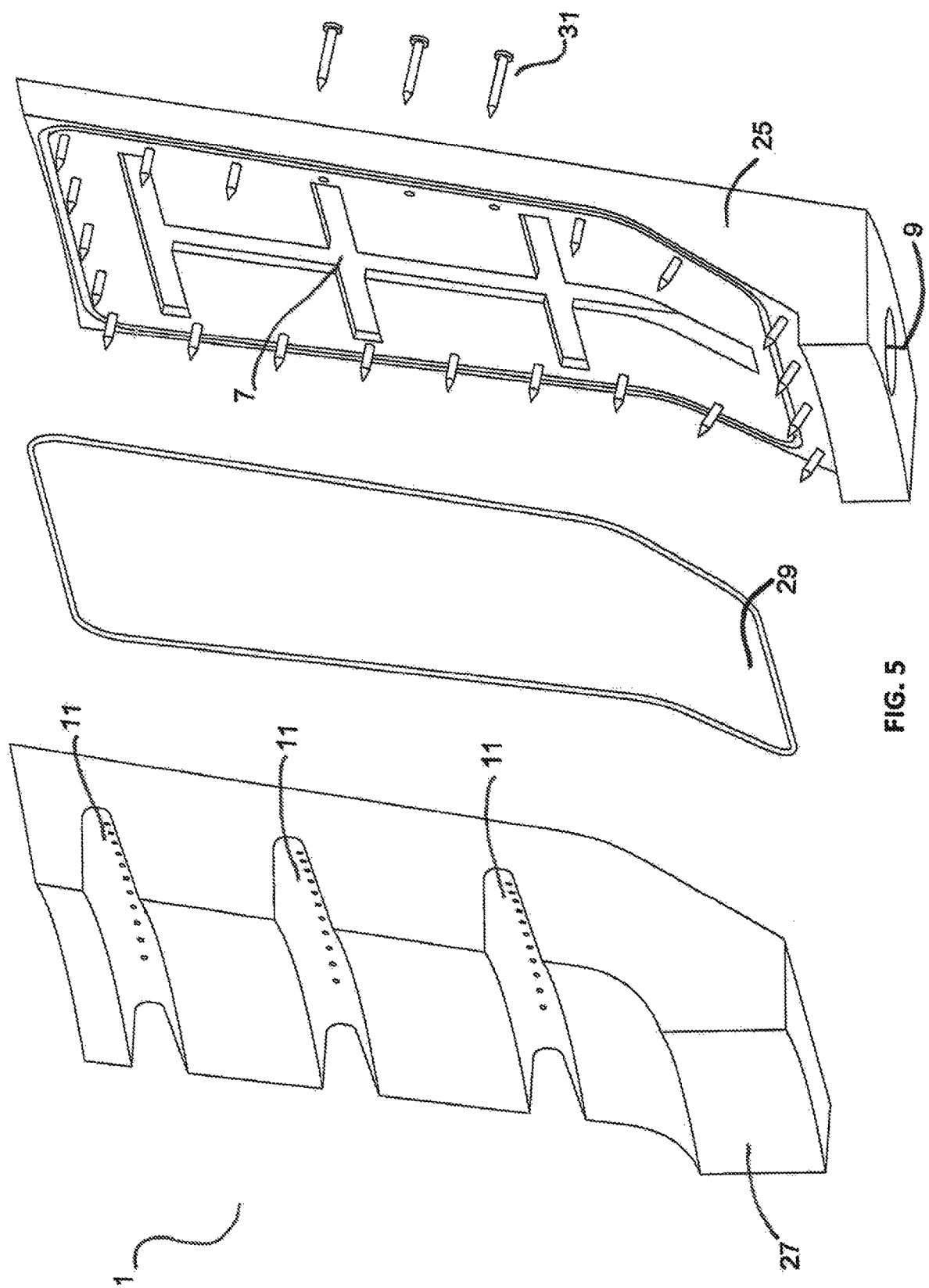
FIG. 5 is an exploded view of another preferred embodiment of the present invention, showing a segment constructed out of a forward and a rearward portion.

Finally, in FIG. 5, we are shown another preferred embodiment of the present invention. In this embodiment, the segment 1 includes a rearward portion 25 and a forward portion 27. The portions are fastened together via fastening means 31. Any suitable fastening means may be used. Optionally a gasket 29 may be used to make a fluid proof seal between to two portions when fully fastened together. Both portions includes a fluid flow channel 7 that complement one another when the two portions are fastened together. In another embodiment, this channel is wholly contained in either the rearward or forward portion. An inflow conduit 9 is included in the rearmost portion and is connected to the fluid flow channel 7. Fluid enters the segment through the inlet conduit 9 and the fluid flows through the fluid flow channel 7 and flows out of the segment through the plurality of outflow ports 11. This creates a fluidised bed arrangement in the vicinity of the outflow ports 11.

Optionally, the rearmost portion 25 is made from a solid durable material, such as steel, whereas the forward portion 27 is made from a different material. Because it is the forward portion 27 that is subjected to wear and tear and the impact loads associated with the operation of the BCC, this embodiment has the advantage that the damaged/worn forward portion 27 can be easily removed from the rearward portion 25 and replaced with a new forward portion 27. It is also optional that at least the forward portion is able to be 3D printed so that a replacement forward portion 27 for that segment is ready when required. This cuts down on inventory considerations, and the logistics involved in handling replacement portions 27.

Another advantage associated with the ability to be able separate the forward and rearward portions of the segment from each other is that this also allows for easy cleaning of the water channel 7 and outflow holes 11.

One of the advantages of the present invention over the prior art is due to the fact that the segments, or the sub-parts of the segments, can be more easily transported to the site where the Batch Centrifugal Concentrator (BCC) will be operated, thereby mitigating the need to transport the large bulky bowl component. The manufacture of the segments, or the replacement of broken or worn out segments, can be manufactured at the site, using a 3D printer. This cuts down significantly on the time it takes for the part to be ordered, manufactured off-site and transported to the site. Another advantage further relates to maintenance of the BCC. The bowl in the BCC is adapted to be deconstructed in-situ. The bowl is no longer unitary, so therefore the need for heavy lifting equipment to manipulate the bowl into or out of the BCC is significantly reduced. The bowl can be dis-assembled and re-assembled in-situ as required. High wear areas of the segment are able to be protected with high wearing inserts. As these inserts wear out over time, then only the insert may need to be replaced. The problem associated with the clogging of the outflow ports is mitigated by use of an insert that nominally covers and protects the outflow ports when the flow of fluid from the outflow port is not flowing.

While the above description includes the preferred embodiments of the invention, it is to be understood that many variations, alterations, modifications and/or additions may be introduced into the constructions and arrangements of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge.

The invention claimed is:

1. A vertically orientated bowl for a batch centrifugal concentrator, said bowl constructed from a plurality of segments that are each placed adjacently to one another, so that each segment is in intimate contact with its neighbouring segments to thereby form a plurality of discreet layers of segments of said bowl, where each discrete layer of segments is in intimate contact with any adjacent layer of segments so that the bowl of the batch centrifugal concentrator is thereby formed from the plurality of said segments formed into the plurality of discrete layers placed one atop another, and wherein the bowl is adapted to be transported to a site in a totally or partially disassembled condition, and then assembled at the site.

2. The bowl as defined in claim 1 wherein the segments are arcuate in shape, and when put in place, they combine to form a bowl shape with a circular profile and a sloping interior sidewall that extends across at least two adjacent layers of segments, and wherein an interior sidewall profile of said bowl is adapted to concentrate precious components from a slurry operated upon by the batch centrifugal concentrator.

3. The bowl as defined in claim 2 wherein there are a plurality of different shapes of segments, and each different shape of segment is capable of being laid adjacent to each other, and in intimate contact with its neighbouring segments, to form one discrete layer within the formation of the bowl.

4. The bowl as defined in claim 3 wherein at least some of the individual segments are constructed out of at least first and second parts.

5. The bowl as defined in claim 4 wherein the first part is a rearward part nearest to the outside of the bowl and the second part is a forward part nearest to the interior of the bowl.

6. The bowl as defined in claim 5 wherein the rearward part is adapted to attach to and retain the forward part.

7. The bowl as defined in claim 6 wherein the segment is adapted to enable the second part to be detached from the first part and replaced by a new second part if the original second part has become damaged or has otherwise reached the end of its useful life and wherein each segment, or at least the forward portion of the segment, is capable of being manufactured on site using a 3D printer.

8. The bowl as defined in claim 4 wherein at least some of the segments include a fluid flow path that allows a fluid to flow into the segment and pass into the segment via at least one inflow conduit, and at least partially flow out of the segment via at least one outflow port, into the interior of the bowl even while the bowl is rotating at operational speed.

9. The bowl as defined in claim 8 wherein the outflow of fluid into the interior of the bowl creates a fluidised bed effect in the vicinity of the outflow port on the interior sidewall of the bowl.

10. The bowl as defined in claim 9 wherein each segment is capable of being fitted with an insert that overlays the at least one outflow port and is adapted to permit the outflow of the fluid, while mitigating the likelihood of the ingress of any solid material into the outflow port, thereby reducing the chance of the outflow port from becoming clogged.

11. The bowl as defined in claim 10 wherein the insert is hinged either at its top or bottom edge, and is capable of swinging away from the outflow port, under the influence on the flow of fluid through the outflow port, and when the flow is suspended, the centrifugal forces associated with the rotating bowl cause the insert to swing back to its position overlaying the outflow port, thereby enabling the insert to act as a barrier, thereby preventing material from clogging the at least one outflow port.

12. The bowl as defined in claim 10 wherein the insert is manufactured from a resilient and robust material.

13. The bowl as defined in claim 12 wherein the material is rubber.

14. The bowl as defined in claim 12 wherein the insert includes a flap portion and a bulbous portion and wherein at least some of the segments that include a fluid flow path are configured to receive the bulbous portion of the insert to retain the insert attached to the segment during use and to enable removal of the insert for replacement.

15. A bowl for a batch centrifugal concentrator, said bowl constructed from a plurality of segments that are each placed adjacently to one another, so that each segment is in intimate contact with its neighbouring segments to form the bowl of the batch centrifugal concentrator; wherein:

the bowl is adapted to be transported to a site in a totally or partially disassembled condition, and then assembled at the site;

at least some of the segments include a fluid flow path that allows a fluid to flow into the segment and pass into the segment via at least one inflow conduit, and at least partially flow out of the segment via at least one outflow port, into the interior of the bowl even while the bowl is rotating at operational speed;

the outflow of fluid into the interior of the bowl creates a fluidised bed effect in the vicinity of the outflow port on the interior sidewall of the bowl; and each segment is capable of being fitted with an insert that overlays the at least one outflow port and is adapted to still permit the outflow of the fluid, while mitigating the likelihood of the ingress of any solid material into the outflow port, thereby reducing the chance of the outflow port from becoming clogged.

16. The bowl as defined in claim 15 wherein the insert is hinged either at its top or bottom edge, and is capable of swinging away from the outflow port, under the influence on the flow of fluid through the outflow port, and when the flow is suspended, the centrifugal forces associated with the rotating bowl cause the insert to swing back to its position overlaying the outflow port, thereby enabling the insert to act as a barrier, thereby preventing material from clogging the at least one outflow port.

17. The bowl as defined in claim 15 wherein the insert is manufactured from a resilient and robust material.

18. The bowl as defined in claim 17 wherein the material is rubber.

19. The bowl as defined in claim 17 wherein the insert includes a flap portion and a bulbous portion.

20. The bowl as defined in claim 19 wherein at least some of the segments that include a fluid flow path are configured to receive the bulbous portion of the insert to retain the insert attached to the segment during use and to enable removal of the insert for replacement.

* * * * *